United States Patent [19]
Wall et al.

[11] Patent Number: 5,088,758
[45] Date of Patent: Feb. 18, 1992

[54] SUSPENSION SYSTEM FOR SEMI TRAILERS

[75] Inventors: Kenneth Wall, Springfield; Ray Mueller, Walnut Grove, both of Mo.

[73] Assignee: Reyco Industries, Inc., Springfield, Mo.

[21] Appl. No.: 568,013

[22] Filed: Aug. 16, 1990

[51] Int. Cl.$^5$ .............................................. B60G 5/00
[52] U.S. Cl. .................................. 280/683; 280/149.2
[58] Field of Search ...................... 280/683, 686, 149.2

[56] References Cited

U.S. PATENT DOCUMENTS

| | | | |
|---|---|---|---|
| 2,971,772 | 2/1961 | Tantlinger et al. | 280/683 |
| 3,233,915 | 2/1966 | Hamlet | 280/683 |
| 3,237,957 | 3/1966 | Harbers | 280/683 |
| 3,309,107 | 3/1967 | Chieger | 280/683 |

Primary Examiner—Kenneth Rice
Attorney, Agent, or Firm—Kokjer, Kircher, Bowman & Johnson

[57] ABSTRACT

A heavy duty suspension system for multiple axle over-the-road semi trailers. A rigid frame for the suspension includes beams on opposite sides which are connected with the trailer body. Hangers receive the front ends of spring beams to which the axles are connected. Torque arms connect the hangers with the axles. Behind the axles, air cushions are interposed between the spring beams and frame to provide an air ride. A transverse track rod is provided behind each axle to accept laterally applied loads. Each track rod is pivoted at one end to the back of one spring beam and at the other end to a track rod hanger suspended from the frame.

11 Claims, 3 Drawing Sheets

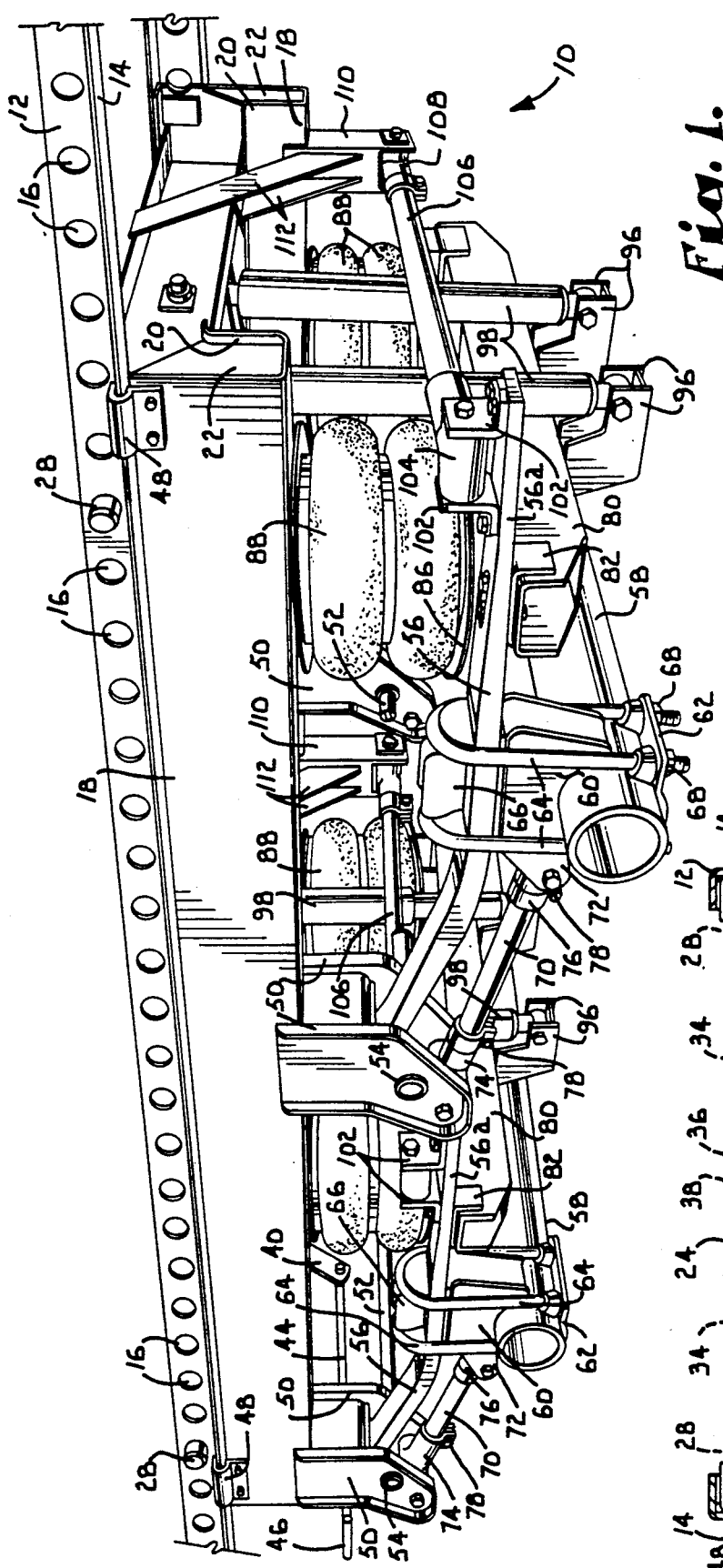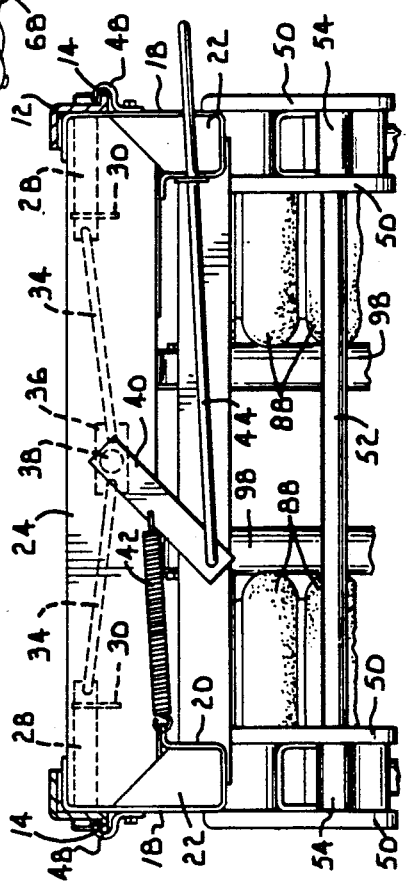

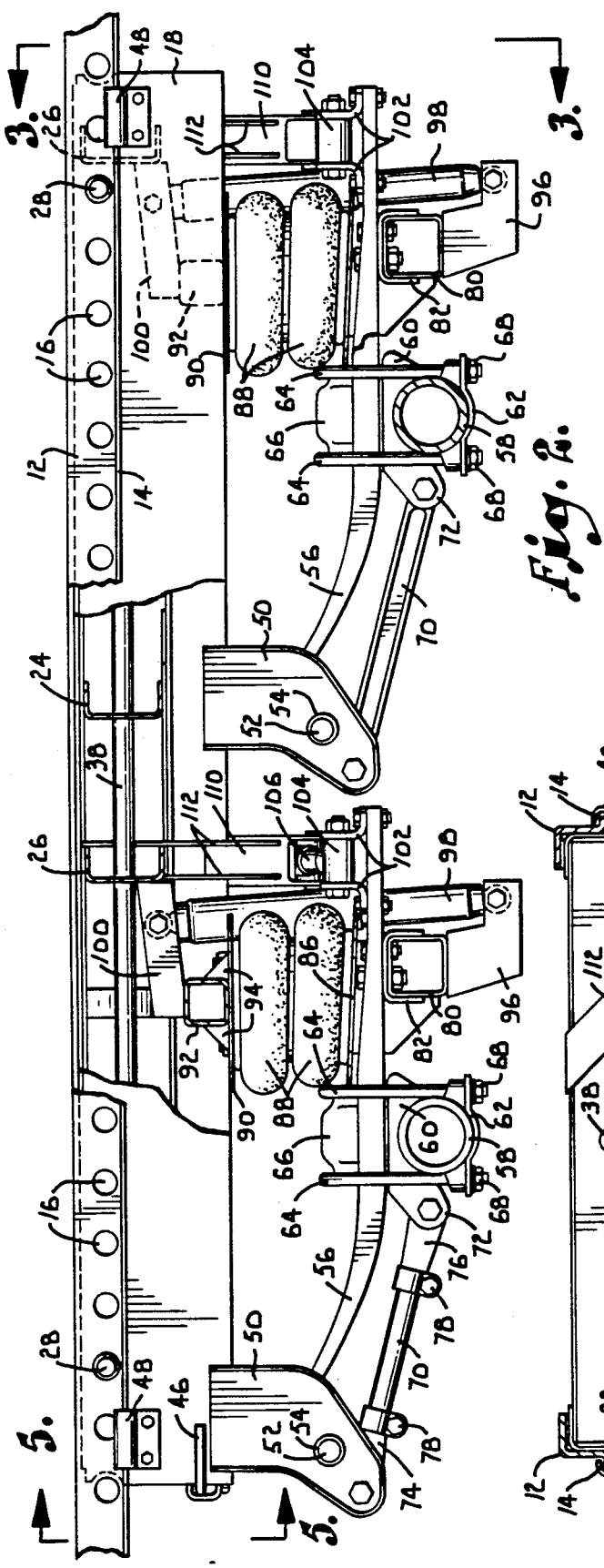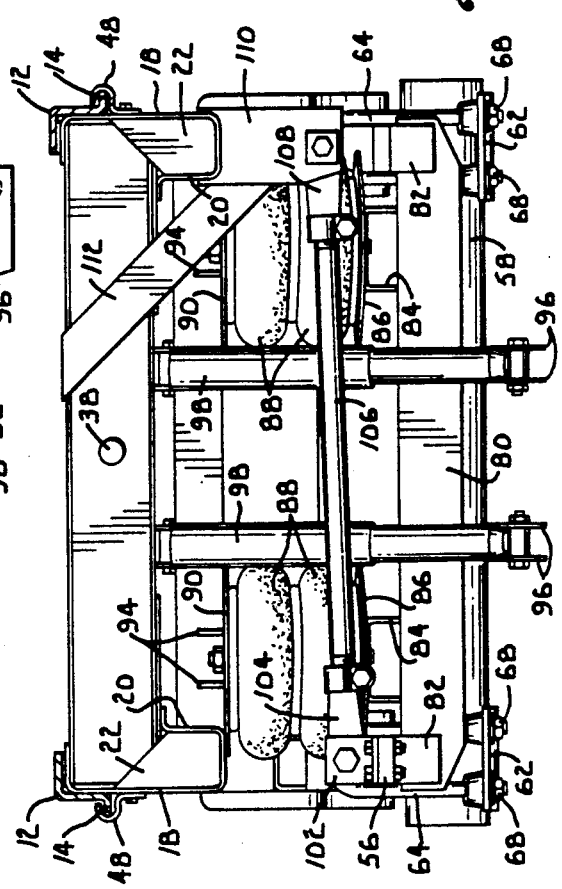

SUSPENSION SYSTEM FOR SEMI TRAILERS

BACKGROUND AND SUMMARY OF THE INVENTION

This invention relates generally to vehicle suspension systems and more particularly to improvements in heavy duty suspensions of the type used on multiple axle over-the-road semi trailers.

In the past, semi trailer suspension systems have normally made use of four spring beams which function as leaf springs to provide at least some resiliency in the connection between the semi trailer body and axles. This type of suspension is rather stiff and can create problems if fragile cargo is being transported. Air cushion suspensions have been proposed and are advantageous in that they provide a softer ride and are less likely to damage the cargo. However, the air ride suspensions that have been proposed in the past are unduly expensive and require heavy components which have an adverse effect on fuel economy and hauling capacity.

The present invention is directed to an improved suspension system which makes use of air cushioning to achieve a soft ride without the cost and weight disadvantages that have plagued other air cushion suspension systems. In accordance with the invention, a heavy duty suspension system includes a pair of leaf spring beams for each axle, with the spring beams acting primarily to resist roll movement of the semi trailer. The spring beams make sliding contact in the hangers projecting from the frame of the suspension, and the axles are mounted near the centers of the spring beams by axle clamp assemblies. Transverse mounting tubes for air cushions are connected with the spring beams and receive the air cushions that provide cushioning that results in a soft ride. The spring beams on one side of the suspension system are pivoted at their back ends to transverse track rods which are pivoted at their opposite ends to rigid hanger brackets fixed to the frame. By virtue of this arrangement, the track rods are able to resist side to side loads and thus relieve the lateral loading on other components. This in turn allows lighter components to be used in the suspension because significant resistance to lateral loading is not required, and the overall weight of the suspension system is reduced accordingly.

The overall arrangement and combination of components provides the advantages of an air ride suspension and yet allows inexpensive and lightweight components to be used. As a consequence, the cost and weight problems traditionally associated with air ride suspensions are significantly reduced without sacrificing the desirable characteristics of an air ride suspension. At the same time, the construction of the suspension is such that it can be used on a wide variety of different types and sizes of over-the-road semi trailers.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a suspension system constructed according to the present invention connected with the frame rails of a semi trailer body;

FIG. 2 is a side elevational view of the suspension system shown in FIG. 1;

FIG. 3 is a fragmentary back end elevational view taken generally along line 3—3 of FIG. 2 in the direction of the arrows;

FIG. 5 is a fragmentary front end elevational view of the suspension system taken generally along line 5—5 of FIG. 2 in the direction of the arrows.

DETAILED DESCRIPTION OF THE INVENTION

Figure 4:
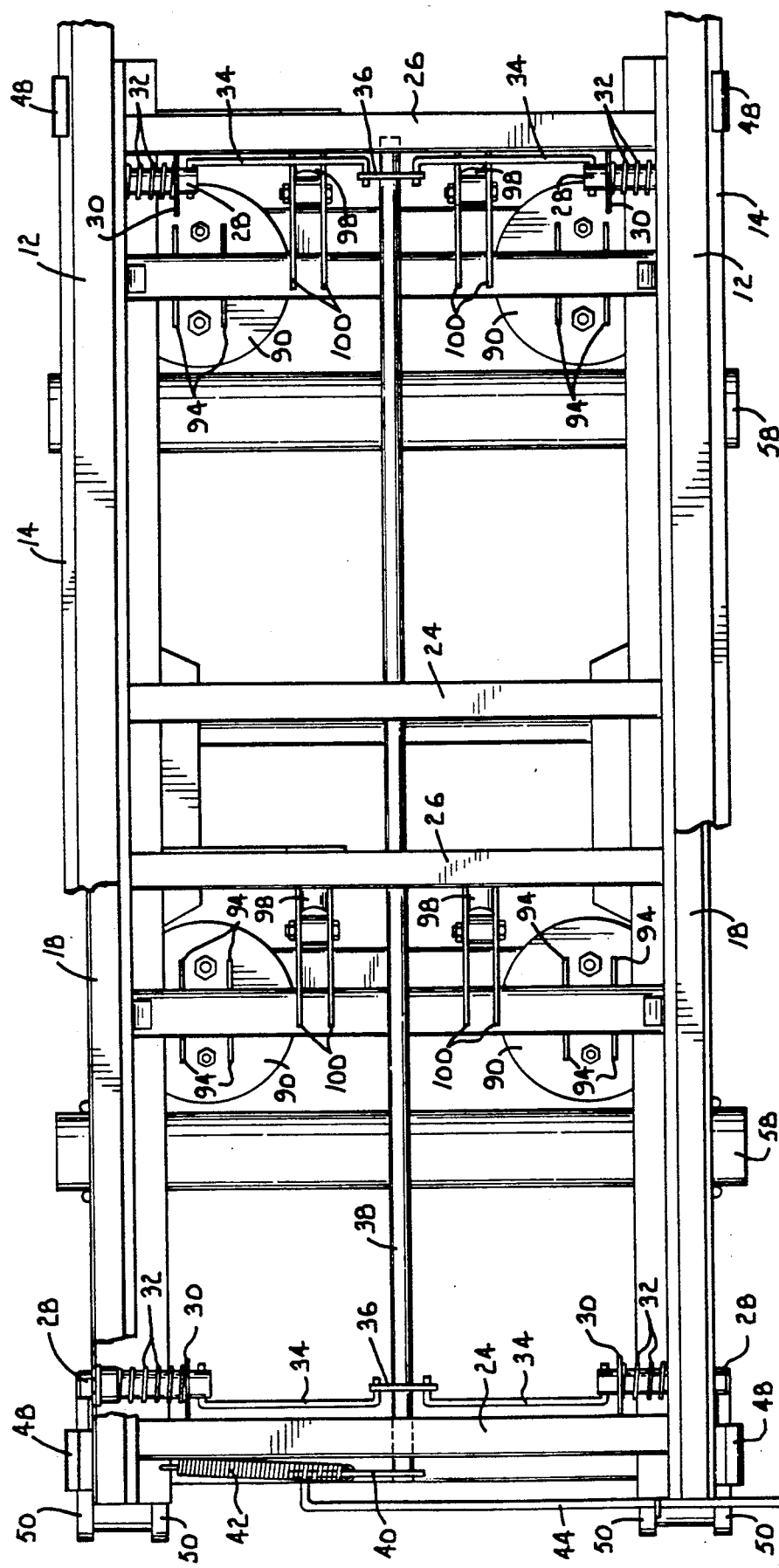
FIG. 4 is a top plan view of the suspension system, with portions broken away for purposes of illustration.

Referring now to the drawings in more detail, the present invention is directed to a heavy duty suspension system which is generally identified by reference numeral 10 and which is used to connect the body of an over-the-road semi trailer with the multiple axles of the semi trailer. The body of the semi trailer is equipped with a pair of opposite side rails 12 which are generally z-shaped in section and which include outwardly projecting lower flanges 14. Uniformly spaced openings 16 are formed through the vertical web of each rail 12 for mounting of the suspension system 10, as will be explained more fully.

The suspension system 10 has a rigid frame which includes a pair of opposite side beams 18 on opposite sides of the suspension frame. The beams 18 are horizontal and are parallel to one another. Each of the beams 18 has the general shape of a channel, but the beams have extended flanges 20 (see FIGS. 3 and 5) on their lower ends. Stiffener plates 22 are secured in the opposite end portions of each beam 18.

As best shown in FIG. 4, the beams 18 are connected together by a pair of cross-members 24, one of which extends between the beams near their forward ends and the other of which extends between the beams slightly to the rear of their midpoints. Another pair of cross members 26 extend between and interconnect the beams 18. The cross members 26 are transverse, with the forward member 26 located near the midpoints of the beams and the rear cross member 26 located near the back ends of the beams. The cross members 24 and 26 may take the form of channel sections, as best shown in FIG. 2.

The frame of the suspension system 10 is connected with the rails 12 in a manner allowing the suspension to be adjusted longitudinally on the rails. The suspension system is locked to the rails 12 by four pins 28, two of which are located near the forward end of the suspension on its opposite sides and the other two of which are located near the rearward end of the suspension on its opposite sides. The pins 28 extend through guide plates 30 which project from the frame cross members. A compression spring 32 is coiled around each pin 28 and acts to continuously urge the pin outwardly such that the pin projects through one of the openings 16 in the rails 12. The base end of each pin connects with a wire link 34, and the opposite end of each link 34 is connected with a small pivot plate 36. The pivot plates 36 are rigidly mounted on a longitudinal rod 38 which extends through all of the cross members 24 and 26 and is able to rotate axially.

A lever 40 is rigidly connected at its upper end with the forward end of rod 38, as best shown in FIG. 5. A tension spring 42 is hooked at one end to the midpoint of the lever 40 and at the opposite end to the flange 20 of one of the beams 18. An elongated operating rod 44 is connected at one end to the bottom end of the lever 40 and extends slidably through one of the beams 18. The outer end of the rod 44 is equipped with a handle 46 which is accessible for manual manipulation of the operating rod.

The forces applied by the springs 32 and 42 normally maintain the pins in extension through the openings 16, and the close fit of the pins in the openings secures the suspension 10 to the rails 12 at the desired location. The suspension can be moved longitudinally on the rails 12 by manipulating the handle 46 of the operating rod 44 such that the lever 40 is pivoted against the force of the spring 42. This in turn pivots rod 38 and the pivot plate 36, thus pulling the links 34 inwardly to withdraw the pins 28 from the openings 16. The suspension system can then be adjusted longitudinally to the desired location, and when the operating handle 46 is released the springs 32 and 42 act to force the pins 28 outwardly such that they extend through the openings 16 at the new location.

C-shaped brackets 48 are secured to the beams 18 and curve around the flanges 14 of the rails 12. The brackets 48 temporarily hold the suspension in place on the rails when the pins 28 are removed from openings 16, and the brackets 48 also serve as guides as the suspension is slid back and forth along the rails 12.

Each beam 18 is provided with a pair of rigid hangers 50 near its forward end and another pair of hangers 50 near its midpoint. The corresponding hangers 50 on the opposite beams 18 are laterally aligned with one another and are rigidly connected by a transverse rod 52. As best shown in FIG. 5, the hangers 50 receive short sleeves 54, and the opposite ends of the cross rod 52 are received in and welded to the sleeves 54. It is noted that the hangers 50 are located immediately below the locations of the two cross members 24 of the suspension frame.

The suspension system 10 includes on each side a pair of leaf spring beams 56. The forward end of each spring beam 56 contacts one pair of the hangers 50 in a sliding fit. The axles 58 of the semi trailer are secured between upper and lower clamp elements 60 and 62 by sets of U-bolts 64. The U-bolts 64 are also received by seat units 66 located on the spring beams 56 near their midpoints. Consequently, when nuts 68 are tightened on the U-bolts 64, each axle 58 is secured between the clamp components 60 and 62 and the axle is at the same time secured to the corresponding spring beams 56.

A torque arm 70 extends between each pair of hangers 50 and a pair of lugs 72 projecting forwardly from the upper clamp member 60. Tee shaped mounting elements 74 and 76 are pivoted between the brackets 50 and the lugs 72, respectively. Each mounting element 74 and 76 has a hollow sleeve into which one end of the torque arm 70 is threaded. This permits adjustment of the length of the torque arm. Bolts 78 may be tightened in order to clamp the sleeves on the torque arms and thereby secure the mounting elements 74 and 76 rigidly to the torque arm 70 once the torque arm has been adjusted to the desired length.

The spring beams 56 are tapered at their rearward end portions, as indicated at 56a. A transverse tube member 80 is secured near its opposite ends with the undersides of the spring beams 56 in each pair on opposite sides of the suspension system 10. The tubes 80 are bolted to the bottoms of the spring beams 56, with a U-shaped reinforcing element 82 interposed between each spring beam and each tube 80. As best shown in FIG. 3, a pair of brackets 84 which may take the form of inverted channels are secured on top of each tube 80 somewhat inwardly of the spring beams 56. Mounted on top of each bracket 84 is a plate 86 on which an air cushion assembly comprising a pair of air cushions 88 is stacked. Thus, each tube 80 is provided with two air cushion assemblies located near the opposite sides of the suspension system 10 and each including two of the air cushions 88.

Each of the air cushion assemblies bears at its upper end against a plate 90. As best shown in FIG. 2, each plate 90 is secured to the bottom of a square tube 92 which extends transversely between the beams 18 on the opposite sides of the suspension system. The connection between each tube 92 and plate 90 is reinforced by triangular gusset plates 94. Because the air cushions 88 are thus interposed between the spring beams 56 and the frame of the suspension system, the air cushions are able to effectively cushion the ride of the semi trailer, providing a relatively soft ride and enough cushioning to protect fragile loads against damage due to jarring forces. It is noted that each axle 58 is provided with a pair of the air cushion assemblies (with each assembly including two air cushions), and the air cushion assemblies are located near the opposite sides of the suspension 10.

Two pair of bracket plates 96 are secured to the bottom of each cross tube 80, and the lower end of a shock absorber 98 is pivoted between each pair of bracket plates 96. The shock absorbers 98 extend vertically and are pivoted at their upper ends between pairs of bracket plates 100 (see FIGS. 2 and 4) which are secured to extend between tube 92 and the adjacent cross member 26. Again, each axle 58 is equipped with a pair of the shock absorbers 96, and the shock absorbers provide additional protection against damage due to jarring forces by serving as a damping device.

The back ends of the spring beams 56 on one side of the suspension system 10 (the right side as viewed in the drawings) terminate at or near the corresponding cross tube 80. However, the leaf spring beams 56 on the other (left) side of the suspension project to the rear well beyond the cross tubes 80. On the back end of these longer leaf springs, a pair of angle brackets 102 are mounted. A mounting element 104 is in turn pivoted between the bracket plates 102. Each mounting element 104 has a hollow sleeve into which is threaded one end of a track rod 106. The opposite end of each track rod 106 is similarly threaded into the sleeve of another mounting element 108 which is pivotedly connected with a rigid hanger bracket 110 which projects downwardly from the beam 18 on the opposite side of the suspension system. Angle braces 112 strengthen the connection between the beam 18 and the hanger bracket 110.

As the semi trailer is driven over the road, the spring beams 56 serve primarily to resist roll movement. The air cushions 88 provide the principal up and down cushioning function and provide a soft air ride which protects fragile cargo against damage. The shock absorbers 98 are able to resist strong jarring forces.

The transverse track rods 106 are oriented substantially horizontally and accept transverse loads applied from side to side. These lateral loads are shared nearly equally among the track rods 106 and the hangers 50, and the remaining components of the suspension are thus protected by the track rods from lateral loading. As a consequence, the remaining components, including the frame components and the torque arms 70, can be made lighter than would otherwise be possible, and this permits the entire suspension 10 to be lighter overall than is possible with a different construction. The track rods 106 provides excellent control of lateral deflection and eliminate rubbing or other interference between the components of the suspension system. In addition, they serve to maintain the air cushions and shock absorbers in the proper positions. Because the track rods 106 are located underneath the frame near the bottom of the suspension system, they can be made relatively long in order to minimize arc induced lateral movement.

Because the spring beams 56 on one side of the frame extend rearwardly beyond the air cushion assemblies, the track rods 106 can be oriented nearly horizontally, and this also contributes to reduction in arc induced lateral movement. The mounting brackets for the track rod can be made relatively short, and this reduces the loads and moments applied to the frame so that lighter components can be used. The configuration of the spring beams also eliminates interference between the beam and brake components. Additionally, there is no need for the costly and heavy bent section of the beam which is commonly found in other air suspension systems.

The rear tapered section 56a of each spring beam decreases the weight and provides clearance between the air cushion mounting bolts and the air cushions without the need for special bolts or deeply recessed pockets in the spring beam. At the same time, the spring beams are relatively thick at the front and are thus able to exhibit stability when resisting roll forces.

Because the air cushion support tubes 80 are mounted to extend beneath the spring beams 56, adequate room is provided for the air cushions 88. More axle travel is also provided. Because each tube 80 is offset to the rear of the corresponding axle 58, interference with brake components is avoided. The tubes 80 also provide for mounting of the shock absorbers and eliminate the need to attach the shock absorbers to the axle at an inclined position.

It is also noteworthy that the construction of the suspension system 10 provides for the use of standard components for the most part, and this reduces the cost and enhances the availability of parts. The advantages of an air ride suspension system are achieved, while the traditional disadvantages of expense and heavy weight components are at the same time avoided.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, I claim:

1. A suspension for an over-the-road semi-trailer having frame rails and plural axles, said suspension comprising:
   a rigid frame having opposite sides;
   means for mounting said frame on said rails;
   rigid hanger means on opposite sides of the frame at a location forwardly from each axle;
   a pair of spring beams for each axle, each spring beam having front and back end portions and being connected with the corresponding axle between said end portions;
   means for supporting the front end portion of each spring beam on the hanger means on one side of the frame;
   a pair of rigid torque arms each connected at one end with one of said hanger means and at another end with the axle;
   an air cushion assembly for each spring beam interposed between the spring beam and frame at a location behind the axle to provide air cushioning for the suspension;
   shock absorber means connected between each axle and frame to dampen motion; and
   a transverse track rod for each axle pivoted at one end to the back end portion of one spring beam on one side of the frame and at another end to the opposite side of the frame to accept transverse loads, each track rod being located behind the corresponding axle.

2. The suspension of claim 1, wherein said frame includes a pair of rigid beams on opposite sides of the frame.

3. The suspension of claim 2, wherein said frame includes a rigid cross member extending between said beams at a location above each track rod.

4. The suspension of claim 3, wherein said frame includes a rigid cross member extending between said beams at a location above each hanger means.

5. The suspension of claim 2, wherein said frame includes a rigid cross member extending between said beams at a location above each hanger means.

6. The suspension of claim 2, including a track rod hanger projecting from one of said beams on said opposite side of the frame, said track rod being pivoted to said rod hanger at said other end and having a substantially horizontal orientation.

7. In a suspension system for a multiple axle over the road semi-trailer having frame rails, the combination of:
   a rigid frame having opposite sides and rigid beams on said opposite sides adapted for connection to said rails;
   a hanger on each beam for each axle, said hangers being rigidly suspended from the beams at a location forwardly of the axle;
   a pair of leaf springs for each axle, each spring having front and back end portions and being connected with the corresponding axle between said end portions, each spring being received at the front end portion thereof on one of said hangers;
   a pair of rigid torque arms extending from the respective hangers to the axle;
   air cushion means interposed between each leaf spring and the frame at a location behind the axle;
   a rigid track rod hanger for each axle extending from the beam on one side of the frame at a location behind the corresponding axle; and a transverse track rod for each rod hanger pivoted at one end to said rod hanger and at another end to the back end portion of the leaf spring on the other side of the frame to thereby accept transverse loads, each track rod being located behind the corresponding axle.

8. The combination of claim 7, wherein said frame includes a rigid cross member extending between said beams at a location above each track rod.

9. The combination of claim 8, wherein said frame includes a rigid cross member extending between said beams at a location above each hanger.

10. The combination of claim 7, wherein said frame includes a rigid cross member extending between said beams at a location above each hanger.

11. A suspension system for an over the road semi-trailer having a pair of frame rails and multiple axles, said suspension system comprising:

a rigid frame having opposite sides and a pair of rigid beams on said opposite sides, said frame including plural cross members connecting said opposite sides at spaced apart locations;

a hanger on each beam for each axle, said hangers being suspended from the beams at a location forwardly of the corresponding axle and said hangers being arranged in sets with the hangers in the sets being laterally aligned on opposite sides of the frame at location below selected cross members of the frame;

a rigid cross bar extending transversely between the hangers in each set;

a pair of spring beams for each axle, each spring beam having front and back end portions and being received at said front end portion thereof on one of said hangers;

means for connecting said axles with the spring beams at locations between said end portions thereof;

a pair of torque arms extending from each hanger to the corresponding axle;

air cushion means interposed between each spring beam and the frame at a location behind the corresponding axle for providing air cushioning of the semi-trailer;

shock absorber means connected between each axle and the frame to dampen motion;

a track rod hanger for each axle extending from one of said beams on one side of the frame at a location behind the corresponding axle; and a transverse track rod for each axle pivoted at one end to said rod hanger and at another end to the back end portion of the spring beam on the other side to accept transverse loads, said track rods being located generally below other selected cross members of the frame and behind the corresponding axles.

* * * * *